United States Patent
Barata et al.

(10) Patent No.: US 10,278,414 B2
(45) Date of Patent: May 7, 2019

(54) METHOD FOR PRODUCING PROTEIN COMPOSITIONS OF LOW SOLUBILITY, COMPOSITIONS PRODUCED, AND USE THEREOF IN BREAD-MAKING PRODUCTS

(71) Applicant: ROQUETTE FRERES, Lestrem (FR)

(72) Inventors: Manuel Barata, Gonnehem (FR); Stéphanie Bureau, Essars (FR)

(73) Assignee: Roquette Freres, Lestrem (FR)

( * ) Notice: Subject to any disclaimer, the term of this patent is extended or adjusted under 35 U.S.C. 154(b) by 262 days.

(21) Appl. No.: 14/438,686

(22) PCT Filed: Oct. 28, 2013

(86) PCT No.: PCT/FR2013/052563
§ 371 (c)(1),
(2) Date: Apr. 27, 2015

(87) PCT Pub. No.: WO2014/068226
PCT Pub. Date: May 8, 2014

(65) Prior Publication Data
US 2015/0289522 A1 Oct. 15, 2015

(30) Foreign Application Priority Data
Oct. 29, 2012 (FR) ..................................... 12 60284

(51) Int. Cl.
| | |
|---|---|
| *A23L 33/185* | (2016.01) |
| *A21D 2/26* | (2006.01) |
| *A21D 13/064* | (2017.01) |
| *A23J 1/14* | (2006.01) |
| *A23J 3/14* | (2006.01) |

(52) U.S. Cl.
CPC ............ *A23L 33/185* (2016.08); *A21D 2/266* (2013.01); *A21D 13/064* (2013.01); *A23J 1/14* (2013.01); *A23J 3/14* (2013.01)

(58) Field of Classification Search
None
See application file for complete search history.

(56) References Cited

U.S. PATENT DOCUMENTS

| | | |
|---|---|---|
| 4,178,391 A | 12/1979 | Chao et al. |
| 2003/0017310 A1 | 1/2003 | Dhalleine et al. |
| 2004/0071852 A1 | 4/2004 | Vodovotz et al. |
| 2010/0227040 A1 | 9/2010 | Muraoka et al. |

FOREIGN PATENT DOCUMENTS

| | | |
|---|---|---|
| EP | 0 522 800 | 1/1993 |
| FR | 2 958 501 | 10/2011 |

OTHER PUBLICATIONS

Dictionary of Food Science, International Food Information Service, 2nd ed., ISIS Publishing, Singapore, 2009, p. 68.*
Dhalleine et al. (FR 2958501), Espacenet Translation—Description only.*
Des Marchais et al., "Bread-making potential of pea protein isolate produced by a novel ultrafiltration/diafiltration process"—Procedia Food Science, vol. 1, Sep. 2011, pp. 1425-1430.*

* cited by examiner

Primary Examiner — Elizabeth Gwartney

(57) ABSTRACT

The invention relates to a method for functionalizing a protein composition, by heating between 100° C. and 160° C. for between 0.1 s and 1 s, then cooling between 60° C. and 90° C., with a pH adjustment to a value of between 6.2 and 9 by means of calcium hydroxide. When used in the production of bread, the protein compositions thus produced allow products to be produced without any unpleasant aftertaste; these bread products are also especially large which provides them with a very pronounced soft character. Such a balance of performances has never been achieved until now for bread-making products.

10 Claims, No Drawings

METHOD FOR PRODUCING PROTEIN COMPOSITIONS OF LOW SOLUBILITY, COMPOSITIONS PRODUCED, AND USE THEREOF IN BREAD-MAKING PRODUCTS

CROSS-REFERENCE TO RELATED APPLICATION

This application is the U.S. national stage application of International Patent Application No. PCT/FR2013/052563, filed Oct. 28, 2013.

The present invention relates to a process for functionalizing a protein composition, by heating between 100° C. and 160° C. for between 0.1 s and 1 s, then cooling between 60° C. and 90° C., with a pH adjustment to a value of between 6.2 and 9 by means of lime. When used in the production of breads, the protein compositions thus obtained allow products to be produced without any unpleasant aftertaste; in addition, these breads have a particularly large volume, which gives them a very pronounced soft nature. Such a balance of performance levels had thus far never been achieved for bread-making products.

For some years, the food industry has expressed an increasing demand for compounds of vegetable origin which have advantageous nutritional properties, without however presenting the problems of allergenicity of compounds of animal origin, such as proteins derived from milk or eggs. In this regard, the applicant has developed and protected a process for functionalizing soluble vegetable proteins through French patent application No. 2 958 501.

One of the originalities of this process is based on the succession of a step a) of very rapid heating (in a period of time of less than one second) of a protein composition to a temperature of between 100° C. and 160° C. and then a cooling step b). The extremely rapid heating step advantageously makes it possible to preserve the functional properties of the proteins while at the same time inhibiting microbial activity. According to the abovementioned document, the protein compositions thus produced can be used in a very wide range of food products.

Armed with this teaching, the applicant has succeeded in demonstrating that such a process can be further improved in the particular field of bread-making, in particular for increasing the volume of the breads produced and therefore improving their soft nature. This is no way calls into question the content of the abovementioned French patent application, and that is indeed one of the merits of the applicant: far from having been content with the teaching and the results previously acquired, it has continued its research with a view to optimizing the process which is the subject of the abovementioned application for producing breads which develop a heightened soft nature without giving off a totally unacceptable aftertaste.

Bread is the result of very complex biological activities, chemical reactions and physical transformations which occur in a mixture of flour derived from bread-making cereals, water, salt and yeast, and sometimes other ingredients (ascorbic acid, flours of other origins, exogenous enzymes, emulsifiers, etc.), under the action of a controlled input of mechanical and thermal energy.

To obtain bread, it is necessary to combine three components of which the action is complementary and indissociable: starch which provides the sugars, gluten responsible for the fine elastic network which gives the whole thing cohesion, and yeast which—as its name in French "levure" indicates—causes the dough to rise ("levee" in French) and lighten.

Kneading, which is the first production step, makes it possible to attain a dough of predetermined consistency, by kneading water, yeast and flour in the presence of air. Carrying out the operation in the correct manner conditions to a large extent the quality of the final products. It makes it possible to form a homogeneous, smooth, tenacious and viscoelastic dough from its two main constituents, namely flour and water, and within which the starch, gluten and air take up respectively 60%, 30% and 10% of the total volume. During this operation, the particles of flour become hydrated, the mixture loses its wet and granular nature, and the dough forms, becomes smooth and homogeneous, and firms up.

The second step, called bulk fermentation, is a resting or first fermentation step, during which the yeasts multiply. It is an important step for the development of the elastic properties of the dough and of the future flavors of the bread. The carbon dioxide produced by the yeasts is trapped in the gluten network, thereby making the dough very elastic.

It is then time for the forming, also called "the turn", which comprises mechanical operations of weighing, dividing the dough and shaping the dough pieces. The dough pieces shaped must be left to stand once more. This is the proving or second fermentation, which allows expansion of the volume of the dough.

Finally, the last phase consists of the transformation of the fermented dough into bread, by putting it in an oven, the temperature of which is fixed at around 250° C.

Gluten has a predominant role in making doughs, and more particularly in making bread. It must first have good water-absorption capacities. The dough piece is the result of mixing flour and water. The gluten proteins must be able to absorb sufficient water to form the dough, which must subsequently have enough resistance against the blending process.

The gluten must also be able to be extensible. In a bread dough, during fermentation, i.e. while the dough rises, carbon dioxide is produced following consumption of sugars by the yeasts. The gas produced inside the dough will stretch the gluten matrix, form gas bubbles and allow the dough to rise. If the gluten is not sufficiently elastic, the gas bubbles will burst and the dough will not rise. Finally, the gluten must show a certain amount of resistance. It is this resistance which will enable the gas to be maintained in the dough until the baking process establishes the structure of the dough.

A good balance between elasticity and extensibility is necessary in order to have a gluten of quality. It is this which enables the gluten network to form during production, making it possible to obtain, in the end, a voluminous and aerated bread. The gluten can thus absorb two to three times its own weight in water and after hydration, then forming the gluten network, an elastic, extensible and impermeable network.

Working on the implementation of the process which is the subject of French patent application No. 2 958 501, the applicant has achieved an optimization which results in breads having a particularly large volume and therefore having a very pronounced soft nature. Furthermore, the breads thus obtained have virtually no aftertaste. It had never been possible to achieve such a balance of properties according to the prior art, as attested to by the examples supporting the present application. Knowing the importance that final consumers attach to the gustative properties and the soft nature of the bread that they purchase, it is possible to understand the usefulness and entire advantage of the process which is the subject of the present invention, and of the protein compositions which ensue therefrom.

The process improvement in question is based, inter alia, on identifying a parameter as one of the keys to optimization, and then on adjusting said parameter. In the case in point, it appeared that the adjustment of the pH was a crucial step of said process, and that this adjustment had to take place through the addition of lime. Not only did the prior process not pay particular attention to this pH adjustment step, but it disclosed only sodium hydroxide as correcting agent.

In addition to their ability not to develop any notable aftertaste in the bread-making products that they serve to produce, the protein compositions obtained by means of the process according to the present invention make it possible to produce breads which have larger volumes than those obtained with the proteins of the prior art in general, and than those obtained with the particular proteins of the prior art according to document No. 2 958 501.

In point of fact, the proteins which are the subject of the present invention are in particular characterized by a low water adsorption capacity, a low solubility and a low emulsifying capacity: these parameters constitute the actual signature thereof. Without wishing to be bound to any theory, the applicant considers that the relatively inert nature in respect of water (as expressed through the parameters mentioned above) of the protein compositions according to the invention facilitates the formation of the gluten network: this results in a bread with a greater volume and with a more pronounced soft nature.

Thus, a first subject of the present invention lies in a process consisting in providing a protein composition, then:
a) in heating said composition to a temperature of between 100° C. and 160° C., in a period of time of between 0.1 and 1 second,
b) in cooling said composition between 50° C. and 80° C., the pH of the composition being adjusted to a value of between 6.2 and 9 before or during or after one of the 2 steps a) and b) mentioned above, the pH adjustment being carried out by adding lime to said composition.

The protein composition to which steps a) and b) of the process according to the invention are applied is obtained by any of the methods well known to those skilled in the art. It is in particular possible to begin by suspending a vegetable flour or gratings, if grated tuberous plants are concerned, in water. The term "vegetable flour" is understood in the broad sense, whether it is an actual vegetable flour or tuberous plant gratings, in particular potato gratings. Indeed, said vegetable flour may be derived from cereals, oleaginous plants, leguminous plants or tuberous plants, used alone or as mixtures, chosen from the same family or from different families.

The suspending step is followed by an extraction of the starch and of the fibers so as to obtain a protein suspension with a solids content of 3% to 15% by weight. At this step, however, when wheat or potato is involved, the proteins are extracted first, while the starch and the fibers are extracted in a second stage. This extraction may consist of any process for obtaining a protein extract well known to those skilled in the art, such as isoelectric precipitation or impregnation followed by a technique for separation by sieving, filtrations, centrifugation or any other equivalent technique.

The precipitation is carried out by lowering the pH of the composition, in particular by adding hydrochloric acid. It is clearly understood that the adjustment of the pH to a value of between 6.2 and 9 as claimed is an operation carried out after the precipitation by lowering the pH.

Thus prepared, the protein composition is advantageously subjected to functionalization steps a) and b) of the process according to the invention. More particularly, steps a) and b) are preceded by the steps consisting in:
1) suspending a vegetable flour in water,
2) extracting the starch and the fibers from said flour so as to obtain a suspension with a solids content of between 3% and 15%,
3) extracting from said suspension a protein extract with a solids content greater than 15%.

At the end of these steps 1) to 3), the protein composition has a temperature of between approximately 30° C. and 60° C.

The process according to the invention therefore comprises a first step of heating a) in a period of time of between 0.1 and 1 second, advantageously carried out by heat exchange with water vapor. In one particular process according to the invention, the heating step is carried out in an injection or infusion chamber, preferably infusion chamber. According to the preferred latter variant, the protein composition is sent directly to the infusion chamber. Concretely, a positive pump of Moineau type (sold under the brand name PCM) transfers the protein composition into the infusion chamber, ensuring a constant and stable pressure and feed rate. The protein composition arrives in the chamber at a temperature of 30° C. to 60° C.

The heating step is carried out by dispersing, circularly, the protein composition in water vapor under pressure. This heating step thus corresponds to a direct exchange process. The protein composition flows vertically and mixes with the vapor without any risk of contact with the hot wall of the infusion chamber. Preferably, the protein composition is heated to a temperature of between 100° C. and 160° C. in less than 1 second. During this heating step, it may be necessary to ensure a precise acclimatization time, for example from 0.1 to 0.8 second, after reaching the desired temperature. In the present invention, the term "acclimatization" denotes any operation in which the protein composition resides at a temperature of between 100° C. and 160° C. for a precise time.

After heating in the infusion chamber, the protein composition falls directly into a positive pump (lobe pump). On exiting the pump, it is cooled according to step b) by pressure reduction while rapidly transferring the hot dispersion into a pressure-reduction chamber at a pressure lower than that used during the heating or into an expansion vessel to bring about a release of vapor in a vacuum chamber. No particular duration is associated with this step.

Preferably, the cooling step b) is carried out by lowering the pressure preferentially below 300 mbar absolute. This lowering is typically carried out in an expansion vessel. In this step, it is desirable to obtain a maximum vaporization and it is possible to chose pressures or pressure reductions (vacuum) which make it possible to achieve this aim. It is thus possible to modulate the amount of solids extract by evaporating off a variable amount of water. Simultaneously, by means of the evolution of vapor, substantial deodorization is obtained.

This cooling step results in the protein composition being brought to a temperature of between 50° C. and 80° C.

The pH of the composition is thus adjusted prior to or during or subsequently to the functionalization which consists of the succession of the abovementioned 2 steps a) and b). The adjustment of the pH between 6.2 and 9 is carried out by adding lime to said composition, this addition taking place via any of the means and devices well known to those skilled in the art.

After functionalization, the process according to the invention may include, following step b), an optional step c)

of homogenization using a high-pressure homogenizer or via a high-shear pump. The process according to the invention may also incorporate, following step b), a drying step d) so as to obtain pulverulent proteins. In this sense, step d) may directly follow step b) (absence of homogenization step) or may take place after the homogenization step c). The drying step is carried out according to a technique such as atomization, granulation or extrusion or by any other drying means known to those skilled in the art, and under conditions suitable for the chosen equipment. Preferably, it is an atomization step.

Another subject of the present invention lies in protein compositions characterized in that they have:
- a water adsorption capacity of less than 4 g of water per gram of product,
- a solubility, measured according to a test A, of less than 20%,
- an emulsifying capacity, measured according to a test B, of between 50 mPa·s and 500 mPa·s.

Preferably, the protein compositions according to the present invention are characterized in that they have:
- a water adsorption capacity of less than 2.5 g of water per gram of product,
- a solubility, measured according to a test A, of less than 15%,
- an emulsifying capacity, measured according to a test B, of between 50 mPa·s and 250 mPa·s.

The water adsorption capacity is determined very simply by double weighing. 10 grams by dry weight of protein composition in powder form are placed in excess water, for 30 minutes. The whole mixture is dried so as to completely evaporate off the water (until no notable change in the mass of the product is any longer observed). The remaining product mass is then weighed. The water adsorption capacity is expressed in g of water adsorbed per gram of initial dry product.

The solubility is measured as follows according to the test A. This solubility test consists in determining the content of matter soluble in water at pH 7.5 via a method of dispersing a test sample of proteins in distilled water and analyzing the supernatant obtained after centrifugation. A test sample of 2.0 g and a magnetic bar (reference No. ECN 442-4510/ company VWR) are placed in a 400 ml beaker. The whole is tared and then 100.0 g of distilled water at 20° C.+/−2° C. are added. The pH is adjusted to 7.5 with 1N HCl or 1N NaOH and the mixture is made up to exactly 200.0 g with distilled water. This mixture is stirred for 30 minutes and then centrifuged for 15 minutes at 3000×g. After centrifugation, exactly 25.0 g of supernatant are withdrawn into a pretared crystallizing dish. The dish is placed in an oven at 103° C. until the mass is constant.

The solubility is calculated using the following equation:

$$\text{Solubility} = \frac{(m1 - m2) \times 200 \times 100}{m3 \times P}$$

with
m1=mass in g of the crystallizing dish after drying
m2=mass in g of the empty crystallizing dish
m3=mass in g of supernatant taken up
P=mass in g of the test sample.

In the present invention, the emulsifying capacity is measured according to the test B hereinafter. A protein suspension is prepared by incorporating 50 g of sample into 250 g of distilled water at 20° C.+/−2° C. with vigorous stirring for 2 minutes at a speed of 250 rpm. 250 g of sunflower oil are incorporated into the suspension as a trickle over 30 seconds, still with vigorous stirring at a speed of 250 rpm and the mixture is left to stir for 2.5 minutes. 11 g of fine cooking salt are added to the protein/water/oil mixture. The stirring is continued for 30 seconds at 250 rpm.

3 storage jars are then filled with the protein/water/oil/salt mixture and the jars are crimp-sealed. The first jar is placed at 4° C.+/−2° C. in a refrigerator for 24 h, then its Brookfield viscosity is determined (Brookfield helipath—stirring speed: 5 rpm) at 20° C.+/−2° C. It is this measurement which corresponds to the emulsifying capacity according to the test B.

The second jar is pasteurized for 1 h 30 in a water bath at 75° C.+/−2° C. and then placed in a basin of cold water for 1 h and stored at 4° C.+/−2° C. in a refrigerator for 24 h; its Brookfield viscosity is then determined (Brookfield helipath—stirring speed: 5 rpm) at 20° C.+/−2° C.

The third jar is sterilized for 1 h in an autoclave at 120° C. and then placed in a basin of cold water for 1 h and stored at 4° C.+/−2° C. in a refrigerator for 24 h; its Brookfield viscosity is then determined (Brookfield helipath—stirring speed: 5 rpm) at 20° C.+/−2° C.

According to one preferential embodiment of the present invention, the vegetable protein is a leguminous plant protein. According to another preferential embodiment, the leguminous plant protein is chosen from the group comprising pea, bean, broad bean and horse bean, and mixtures thereof. Even more preferably, said leguminous plant protein is pea protein. The term "pea" is considered here in its most widely accepted sense and includes in particular: —all the wild varieties of "smooth pea", and—all the mutant varieties of "smooth pea" and of "wrinkled pea", irrespective of the uses for which said varieties are generally intended (food for human consumption, animal feed and/or other uses).

Another subject of the present invention is the use of the abovementioned protein compositions, in a bread producing process.

A final subject of the present invention consists of a bread obtained by using a protein composition according to the invention.

The examples which follow will make it possible to illustrate the application more clearly, without however limiting the scope thereof.

EXAMPLES

Example 1

This example illustrates 4 processes for producing protein compositions:
- a process according to the prior art, without rapid increase in temperature, and with pH adjustment with sodium hydroxide;
- a process according to the prior art, without rapid increase in temperature, and with pH adjustment with lime;
- a process according to the prior art (as described in application No. FR 2 958 501) by rapid heating (<1 s) then cooling, and with pH adjustment with sodium hydroxide;
- a process according to the invention by rapid heating (<1 s) then cooling, and with pH adjustment with lime.

It illustrates the protein compositions thus obtained and some of their characteristics (such as their solubility, their water adsorption capacity, their emulsifying capacity).

Test No. 1 According to the Prior Art: Conventional Process without Heat Treatment and Correction with Sodium Hydroxide A pea protein composition is prepared in the following way.

Pea flour is prepared by milling shelled fodder peas on an Alpine hammer mill equipped with a 100 µm grille. 300 kg of flour containing 87% solids are then soaked in water at a final concentration of 25% on a dry basis, at a pH of 6.5. 1044 kg of flour suspension containing 25% of solids (i.e. thus 261 kg of dry flour) are then introduced with 500 kg of water into a 14-stage hydrocyclone battery, fed with the flour suspension at stage No. 5.

This separation leads to the production of a light phase which corresponds to the output of stage No. 1. It consists of the mixture of proteins, internal fibers and soluble matter. This light phase at the hydrocyclone outlet contains as a mixture (142 kg on a dry basis in total): fibers (approximately 14.8% by weight, i.e. 21 kg dry), proteins (approximately 42.8% by weight, i.e. 60.8 kg dry) and soluble matter (approximately 42.4% by weight, i.e. 60.2 kg dry). This fraction has a solids content of 10%.

The fibers are separated on Westfalia centrifugal decanters. The light phase exiting the centrifugal decanter contains a mixture of proteins and soluble matter, whereas the heavy phase contains the pea fibers. The heavy phase contains 105 kg of fibers containing 20% solids. It is noted that virtually all of the fibers are indeed found in this fraction. As regards the protein and soluble matter fraction, it contains 1142 kg of a mixture in solution of soluble matter and proteins (fraction containing 6% solids).

The proteins are flocculated at their isoelectric point by adjusting the light phase exiting the centrifugal decanter to a pH of 4.5 (by adding hydrochloric acid) and heating to 60° C. by passing through a nozzle. The proteins thus flocculated are left in a maturing tank for 10 minutes.

Separation of the soluble matter/proteins is then carried out on a centrifugal decanter. The mixture obtained at the outlet of the maturing tank then feeds the centrifugal decanter at a flow rate of 0.5 m³/h. The heavy phase, or "floc", which has a solids content of 35%, is diluted to 10% by adding water. The pH of the floc of 4.5 is corrected to a value of 7.5 by adding sodium hydroxide.

Finally, atomization is carried out on a single-effect tower with a compressed air nozzle in order to dry the product, with a drying air temperature of 150° C., and a mist temperature of 85° C., the evaporation capacity being 20 l/h and the pressure being 1 bar. A protein composition in powder form, termed protein composition 1, is obtained.

Test No. 2 According to the Prior Art: Conventional Process without Heat Treatment and Correction with Lime The process is identical in all respects to that described in test No. 2, the only difference being that the pH of the floc of 4.5 is corrected to a value of 7.5 by adding lime. A protein composition in powder form, termed protein composition 2, is obtained.

Test No. 3 According to the Prior Art: Rapid Heating (<1 s) then Cooling and Correction with Sodium Hydroxide The process is identical here to that described in test No. 1, until the obtaining of the heavy phase. The pH of 4.5 of the protein extract is corrected to a value of 7.5 by adding sodium hydroxide.

The protein extract thus obtained is subjected to a heat treatment of 122° C. for 0.2 s in a Simplex SDH infuser or infusion chamber, and it is then cooled to 45.5° C. by pressure reduction in an expansion vessel under vacuum or flash cooling.

Finally, atomization is performed on an MSD (Multi Stage Dryer) tower under the following conditions. An MSD atomization tower is chosen and is fed with the pea proteins derived from the Simplex infuser. The drying air enters at 180° C. and leaves at 80° C., the static bed at the bottom of the tower being heated with air at 80° C. At the outlet of the atomization tower, the product passes onto a vibrating fluid bed where it is cooled to ambient temperature. Recycling of the fines may advantageously be performed.

This set of operations makes it possible to obtain a pea protein powder according to the prior art, with an average diameter of 200 µm and an average density of 0.4. A protein composition in powder form, termed protein composition 3, is obtained.

Test No. 4 According to the Invention: Rapid Heating (<1 s) and Cooling then Correction with Lime The process is identical in all respects to that described in test No. 3, the only difference being that the pH of the floc of 4.5 is corrected to a value of 7.5 by adding lime. The set of operations makes it possible to obtain a pea protein powder in accordance with the invention, with an average diameter of 200 µm and an average density of 0.4. A protein composition in powder form, termed protein composition 4, is obtained.

Test No. 5 According to the Invention: Rapid Heating (<1 s) and Cooling then Correction with Lime The process is the one described in test No. 4, but differs therefrom in that:
  the heat treatment of the protein extract is carried out at 135° C. for 0.4 s, followed by cooling to 50° C.;
  the pH of the floc of 4.5 is corrected to a value of 6.6 by adding lime.

The set of operations makes it possible to obtain a pea protein powder in accordance with the invention, with an average diameter of 200 µm and an average density of 0.4. A protein composition in powder form, termed protein composition 5, is obtained.

Test No. 6 According to the Invention: Rapid Heating (<1 s) and Cooling then Correction with Lime The process is the one described in test No. 4, but differs therefrom in that:
  the heat treatment of the protein extract is carried out at 135° C. for 0.9 s, followed by cooling to 70° C.;
  the pH of the floc of 4.5 is corrected to a value of 7 by adding lime.

The set of operations makes it possible to obtain a pea protein powder in accordance with the invention, with an average diameter of 200 µm and an average density of 0.4. A protein composition in powder form, termed protein composition 6, is obtained.

Test No. 7 According to the Invention: Rapid Heating (<1 s) and Cooling then Correction with Lime The process is the one described in test No. 4, but differs therefrom in that:
  the heat treatment of the protein extract is carried out at 135° C. for 0.9 s, followed by cooling to 80° C.;

The set of operations makes it possible to obtain a pea protein powder in accordance with the invention, with an average diameter of 200 µm and an average density of 0.4. A protein composition in powder form, termed protein composition 7, is obtained.

Test No. 8 According to the Invention: Rapid Heating (<1 s) and Cooling then Correction with Lime The process is the one described in test No. 4, but differs therefrom in that:
  the heat treatment of the protein extract is carried out at 150° C. for 0.9 s, followed by cooling to 70° C.;

the pH of the floc of 4.5 is corrected to a value of 9 by adding lime.

The set of operations makes it possible to obtain a pea protein powder in accordance with the invention, with an average diameter of 200 μm and an average density of 0.4. A protein composition in powder form, termed protein composition 8, is obtained.

Test No. 9 According to the Invention: Rapid Heating (<1 s) and Cooling then Correction with Lime The process is the one described in test No. 4, but differs therefrom in that:
the heat treatment of the protein extract is carried out at 145° C. for 0.2 s, followed by cooling to 70° C.;
the pH of the floc of 4.5 is corrected to a value of 7 by adding lime.

The set of operations makes it possible to obtain a pea protein powder in accordance with the invention, with an average diameter of 200 μm and an average density of 0.4. A protein composition in powder form, termed protein composition 9, is obtained.

Test No. 10 According to the Invention: Rapid Heating (<1 s) and Cooling then Correction with Lime The process is the one described in test No. 4, but differs therefrom in that:
the heat treatment of the protein extract is carried out at 122° C. for 0.3 s, followed by cooling to 55° C.;
the pH of the floc of 4.5 is corrected to a value of 8 by adding lime.

The set of operations makes it possible to obtain a pea protein powder in accordance with the invention, with an average diameter of 200 μm and an average density of 0.4. A protein composition in powder form, termed protein composition 9, is obtained.

Table 1 hereinafter recapitulates the values of the water adsorption capacity, of solubility measured according to the test A and of emulsifying capacity measured according to the test B. In addition, the values of the Brookfield viscosities measured in the test B, with regard to the second jar (pasteurized at 75° C.) and the third jar (sterilized at 120° C.) have also been revealed.

This table reveals entirely singular and distinctive characteristics of the protein composition according to the invention, which, in the case in point, has: a low solubility, a low water adsorption capacity and a low emulsifying capacity.

Example 2

This example illustrates the production of breads according to the prior art (breads A, B and C made with the protein compositions obtained according to tests No. 1 to 3) and of a bread according to the invention (bread D using the protein composition obtained according to test No. 4). The composition of each dough is indicated in the following Table 2.

The various ingredients are introduced into the kneading machine, which consists of a spiral mixer. Kneading is carried out for 2 minutes at speed 1 and then for 1.8 minutes at speed 2. The dough is left to stand for 15 minutes. It is then cut up and shaped and the dough pieces are left to stand for 15 minutes. 5 different dough pieces are thus prepared for each bread A, B, C and D. Proofing is carried out in an oven for 1 h 30 at 30° C. and at 85% relative humidity. Finally, baking is carried out at 220° C. for 30 minutes.

The bread volumes are then measured using a sesame seed volumeter, a device well known to those skilled in the art (reference may in particular be made to document EP 1 067 841 A1). The volumes are measured every 15 minutes. The increase in volume is finally calculated (% increase in volume of the dough piece relative to its initial volume).

TABLE 2

|  | Bread A | Bread B | Bread C | Bread D |
|---|---|---|---|---|
| Wheat flour | 830 | 830 | 830 | 830 |
| Gluten | 70 | 70 | 70 | 70 |
| Protein composition 1 | 100 | — | — | — |
| Protein composition 2 | — | 100 | — | — |
| Protein composition 3 | — | — | 100 | — |
| Protein composition 4 | — | — | — | 100 |
| Salt | 18 | 18 | 18 | 18 |
| Dry yeast | 7 | 7 | 7 | 7 |
| Ascorbic acid | 0.2 | 0.2 | 0.2 | 0.2 |
| Nutrilife AM17 | 0.2 | 0.2 | 0.2 | 0.2 |
| Water (20° C.) | 715 | 715 | 715 | 715 |

For each bread A, B, C and D, the average of the 5 measurements of increase in volume is calculated so as to

TABLE 1

|  | Test 1 | Test 2 | Test 3 | Test 4 | Test 5 |
|---|---|---|---|---|---|
| Water absorption | 4.4 | 2.5 | 4.8 | 2.4 | 2.6 |
| Solubility (g/g) | 54.9 | 13.5 | 55.0 | 13.1 | 12.5 |
| Emulsifying capacity according to test B (mPa · s) | 74 000 | 3000 | 1 000 000 | 1560 | 1280 |
| Emulsion 75° C. | 10 000 | 5200 | 1 000 000 | 4700 | 1720 |
| Emulsion 120° C. | 150 000 | 21 000 | 280 000 | 10 000 | 12 000 |

|  | Test 6 | Test 7 | Test 8 | Test 9 | Test 10 |
|---|---|---|---|---|---|
| Water absorption | 2.6 | 2.5 | 3.4 | 4.2 | 2.7 |
| Solubility (g/g) | 10.5 | 13 | 19.7 | 14.7 | 12.9 |
| Emulsifying capacity according to test B (mPa · s) | 1600 | 1320 | 1540 | 1440 | 1280 |
| Emulsion 75° C. | 8000 | 3960 | 3340 | 2560 | 3520 |
| Emulsion 120° C. | 9200 | not done | not done | not done | not done | obtain an average increase in volume; this average increase in volume (%) is indicated in Table 3.

TABLE 3

|  | Bread A | Bread B | Bread C | Bread D |
|---|---|---|---|---|
| Average increase in volume (%) | 155 | 174 | 165 | 175 |

Breads B and D obtained with protein compositions 2 and 3 (pH correction with lime) stand out because of a larger volume. In addition, a more pronounced soft nature is noted.

Finally, 15 individuals were asked to taste breads A, B, C and D while giving them a grade, according to the aftertaste that they have: 0 for an absence of aftertaste, 2 for a pronounced aftertaste, and 1 for the presence of a slight aftertaste.

Table 4 reports all of the grades obtained.

TABLE 4

| Tester | Bread A | Bread B | Bread C | Bread D |
|---|---|---|---|---|
| 1 | 1 | 1 | 0 | 0 |
| 2 | 1 | 1 | 0 | 0 |
| 3 | 1 | 1 | 0 | 0 |
| 4 | 1 | 1 | 0 | 0 |
| 5 | 1 | 1 | 0 | 0 |
| 6 | 1 | 1 | 0 | 0 |
| 7 | 0 | 1 | 0 | 0 |
| 8 | 2 | 2 | 1 | 0 |
| 9 | 1 | 2 | 1 | 1 |
| 10 | 0 | 1 | 0 | 0 |
| 11 | 1 | 1 | 0 | 0 |
| 12 | 1 | 1 | 0 | 0 |
| 13 | 2 | 2 | 1 | 0 |
| 14 | 2 | 2 | 1 | 1 |
| 15 | 2 | 2 | 1 | 1 |

Only breads C and D do not make reference to the notable presence of aftertaste. Consequently, only bread D, which uses protein composition 4, advantageously has a considerable volume and therefore a considerable softness, without however showing a pronounced aftertaste.

The invention claimed is:

1. A process comprising:
   providing a vegetable protein composition,
   a) heating said vegetable protein composition to a temperature of between 100° C. and 160° C., in one of an injection and an infusion chamber, for between 0.1 and 1 second, and
   b) cooling said heated vegetable protein composition to between 55° C. and 80° C.,
   wherein the pH of the vegetable protein composition is adjusted to a value of between 6.2 and 9 before or during or after one of steps a) and b) by adding lime to said composition, to produce a processed vegetable protein composition having a solubility of less than 20%, measured according to a test of placing 2.0 g of a test sample of processed vegetable protein composition and a magnetic bar in a 400 mL beaker, adding 100.0 g of distilled water at 20° C.+/−2° C. adjusting the pH to 7.5 with 1N HCl or 1N HCl or 1N NaOH and making up the mixture to 200.0 g with distilled water, stirring this mixture for 30 minutes, then centrifuging for 15 minutes at 3000×g, withdrawing 25.0 g of supernatant into a pre-tared crystallizing dish after centrifugation, placing the crystallizing dish in an oven at 103° C. until the mass is constant and calculating the solubility using the following equation:

$$\text{Solubility} = \frac{(m1 - m2) \times 200 \times 100}{m3 \times P}$$

with m1=mass in g of the crystallizing dish after drying
m2=mass in g of the empty crystallizing dish
m3=mass in g of supernatant taken up
P=mass in g of the test sample.

2. The process according to claim 1, wherein steps a) and b) are preceded by the steps comprising:
   1) suspending a vegetable flour comprising starch and fiber in water,
   2) extracting the starch and the fibers from said flour so as to obtain a suspension with a solids content of between 3% and 15%, and
   3) extracting from said suspension a protein extract with a solids content of greater than 15%.

3. The process according to claim 1, wherein the heating is carried out by heat exchange with water vapor in one of said chambers.

4. The process according to claim 3, wherein the heating is carried out in an infusion chamber.

5. The process according to claim 3, wherein the cooling is carried out by lowering the pressure in a pressure-reduction chamber or in an expansion vessel.

6. The process according to claim 1, wherein the processed product is homogenized using a high-pressure homogenizer or via a high-shear pump.

7. The process according to claim 1, wherein the processed product is dried by atomization, granulation or extrusion.

8. A processed vegetable protein composition prepared according to the process of claim 1.

9. A method for producing bread comprising, mixing a processed vegetable protein composition of claim 8 to baking ingredients, subjecting the obtained mixture to a bread producing process and producing bread.

10. A bread obtained by the method of claim 9.

* * * * *